(12) United States Patent
Mori et al.

(10) Patent No.: US 11,092,442 B2
(45) Date of Patent: Aug. 17, 2021

(54) HOST VEHICLE POSITION ESTIMATION DEVICE

(71) Applicant: TOYOTA JIDOSHA KABUSHIKI KAISHA, Toyota (JP)

(72) Inventors: Yusuke Mori, Susono (JP); Koki Suwabe, Susono (JP); Kojiro Tateishi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 187 days.

(21) Appl. No.: 16/285,866

(22) Filed: Feb. 26, 2019

(65) Prior Publication Data
US 2019/0293435 A1 Sep. 26, 2019

(30) Foreign Application Priority Data
Mar. 26, 2018 (JP) .............................. JP2018-058596

(51) Int. Cl.
*G01C 21/30* (2006.01)
(52) U.S. Cl.
CPC .................................. *G01C 21/30* (2013.01)
(58) Field of Classification Search
CPC .................. G01C 21/32; G01C 21/30
See application file for complete search history.

(56) References Cited

U.S. PATENT DOCUMENTS

| | | | |
|---|---|---|---|
| 2017/0038477 A1* | 2/2017 | Schmid | G01S 19/48 |
| 2017/0277716 A1* | 9/2017 | Giurgiu | G06F 16/2365 |
| 2017/0313297 A1* | 11/2017 | Okada | B60W 40/04 |
| 2018/0231387 A1* | 8/2018 | Thiel | G01C 21/32 |
| 2018/0239032 A1* | 8/2018 | Thiel | G01S 19/48 |
| 2018/0246907 A1* | 8/2018 | Thiel | G01C 21/32 |

FOREIGN PATENT DOCUMENTS

JP    2007-101690 A    4/2007

* cited by examiner

*Primary Examiner* — Peter D Nolan
*Assistant Examiner* — Demetra R Smith-Stewart
(74) *Attorney, Agent, or Firm* — Sughrue Mion, PLLC

(57) ABSTRACT

A host vehicle position estimation device includes: a detected position recognition unit configured to recognize a detected position of a first target object included in a first recognition range and a detected position of a second target object included in a second recognition range; a host vehicle first position estimation unit configured to estimate a host vehicle first position; a host vehicle second position estimation unit configured to estimate a host vehicle second position; and a deviation determination unit configured to determine that there is a deviation between the detected position of the target object and the information on the position of the target object on the map if a distance between the host vehicle first position and the host vehicle second position is equal to or greater than a deviation threshold value.

11 Claims, 11 Drawing Sheets

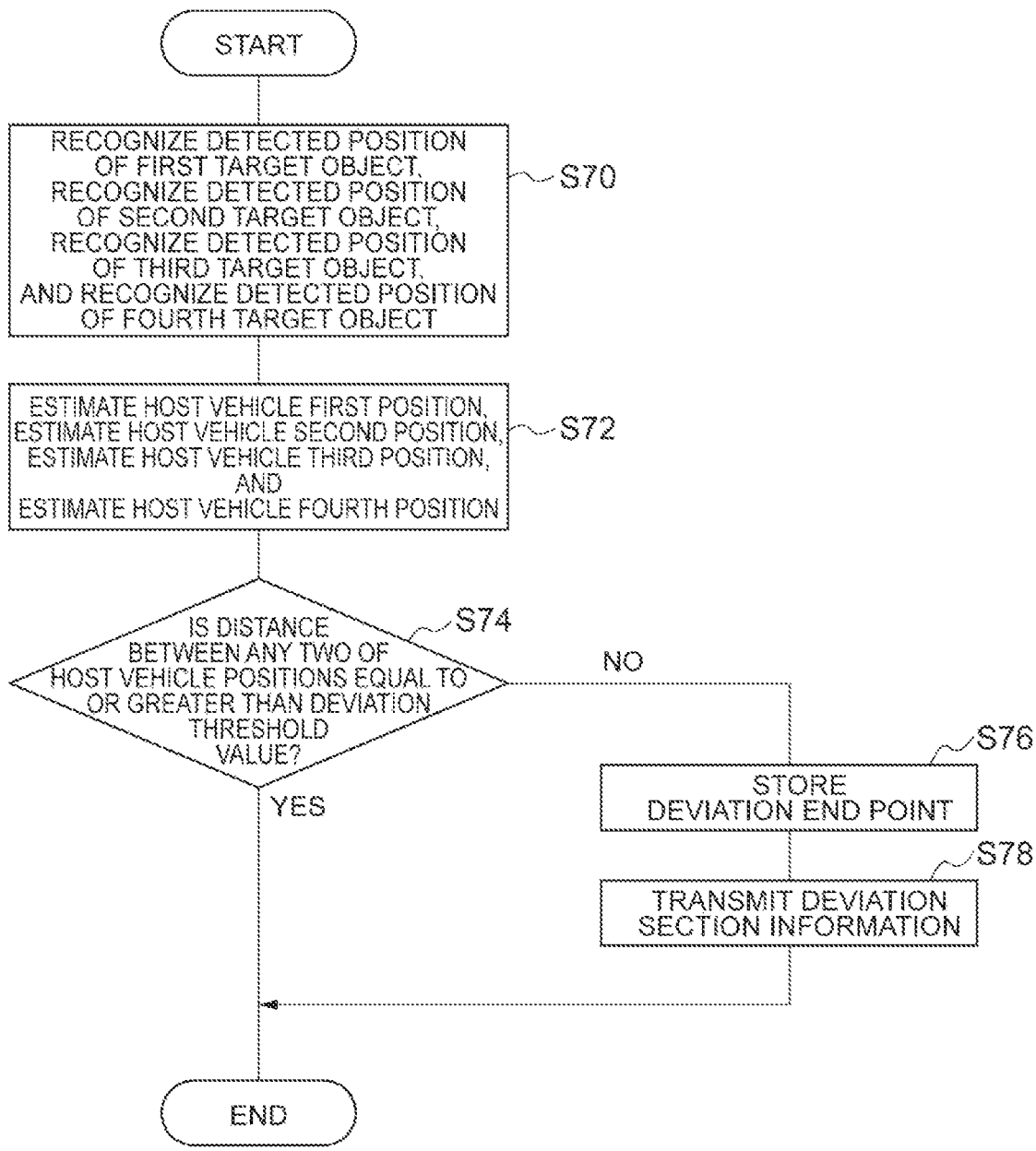

HOST VEHICLE POSITION ESTIMATION DEVICE

TECHNICAL FIELD

The present disclosure relates to a host vehicle position estimation device.

BACKGROUND

In the related art, Japanese Unexamined Patent Publication No. 2007-101690 is known as a technical literature relating to a host vehicle position estimation device. In this publication, it is disclosed that a host vehicle position is highly accurately estimated using marks such as three-dimensional objects around the host vehicle.

CROSS-REFERENCE TO RELATED APPLICATION

This application claims the benefit of priority from Japanese Patent Application No. 2018-058596, filed Mar. 26, 2018, the entire contents of which are incorporated herein by reference.

SUMMARY

However, in estimating the host vehicle position using a target object such as a three-dimensional object, if the position of the target object serving as the mark changes due to construction or the like, an actual position of the target object and information on the position of the target object on the map deviate from each other and an error may occur in a result of estimation of the host vehicle position. Therefore, in this technical field, it is desirable to provide a host vehicle position estimation device that can appropriately determine the deviation between the actual position of the target object and the information on the position of the target object on the map.

In order to solve the problem, according to an aspect of the present disclosure, there is provided a host vehicle position estimation device that estimates a host vehicle position which is a position of a host vehicle on a map based on a detected position of a target object detected by an external sensor mounted on the host vehicle and information on the position of the target object on the map. The device includes: a detected position recognition unit configured to recognize a detected position of a first target object which is the target object included in a first recognition range set in advance around the host vehicle and a detected position of a second target object which is the target object included in a second recognition range that does not overlap with the first recognition range around the host vehicle, based on a result of detection performed by the external sensor; a host vehicle first position estimation unit configured to estimate a host vehicle first position based on the detected position of the first target object and the information on the position of the first target object on the map; a host vehicle second position estimation unit configured to estimate a host vehicle second position based on the detected position of the second target object and the information on the position of the second target object on the map; and a deviation determination unit configured to determine that there is a deviation between the detected position of the target object and the information on the position of the target object on the map if a distance between the host vehicle first position and the host vehicle second position is equal to or greater than a deviation threshold value.

In the host vehicle position estimation device in an aspect of the present disclosure, the host vehicle first position is estimated from the detected position of the first target object included in the first recognition range around the host vehicle and the information on the position of the first target object on the map, and the host vehicle second position is estimated from the detected position of the second target object included in the second recognition range which does not overlap with the first recognition range and the information on the position of the second target object on the map. According to host vehicle position estimation device, since it can be considered that the distance between the host vehicle first position and the host vehicle second position is small if the actual position of the target object and the information on the position of the target object on the map match with each other, if the distance between the host vehicle first position and the host vehicle second position is equal to or greater than the deviation threshold value, it is determined that there is the deviation between the detected position of the target object and the information on the position of the target object on the map. Therefore, it is possible to appropriately determine the deviation between the actual position of the target object and the information on the position of the target object on the map.

In the host vehicle position estimation device in the aspect of the present disclosure, the first recognition range may be a range set at a position in front of the host vehicle with respect to the second recognition range.

As described above, according to the host vehicle position estimation device in the aspect of the present disclosure, it is possible to appropriately determine the deviation between the actual position of the target object and the information on the position of the target objet the map.

BRIEF DESCRIPTION OF THE DRAWINGS

FIG. 11 is a flowchart illustrating deviation end determination processing in the second embodiment.

DETAILED DESCRIPTION

Hereinafter, embodiments of the present disclosure will be described with reference to the drawings.

First Embodiment

Figure 1:
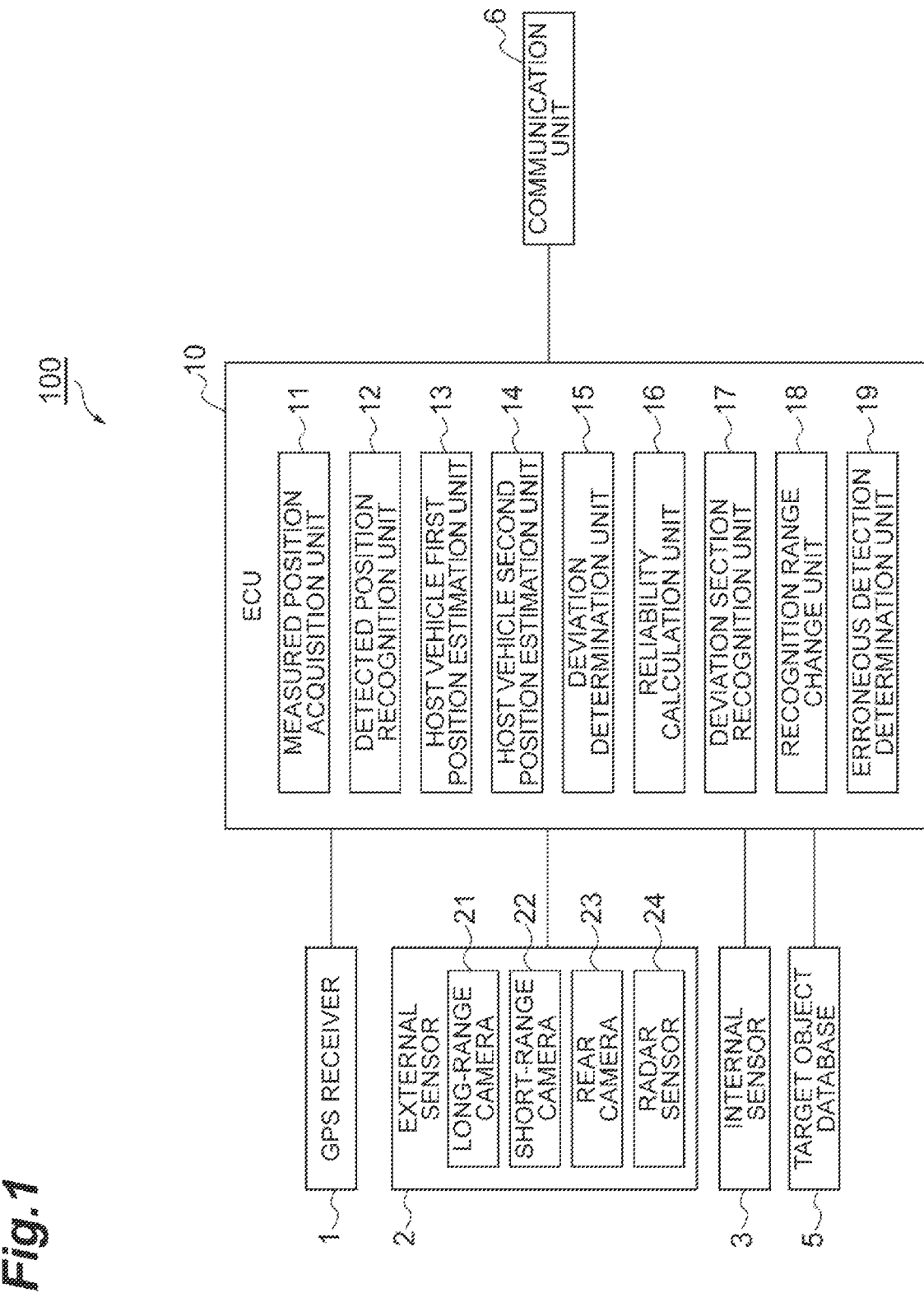
FIG. 1 is a block diagram illustrating a host vehicle position estimation device in a first embodiment.

A host vehicle position estimation device 100 in a first embodiment illustrated in FIG. 1 is a device mounted on a host vehicle and estimating a host vehicle position which is a position of the host vehicle on the map. The host vehicle position estimation device 100 estimates the host vehicle position using a target object.

The target object is an object of which the position information is stored in the map and is used as a reference for estimating the host vehicle position. Demarcation lines are included in the target object. The demarcation line includes at least one of a roadway boundary line, a lane boundary line, and a center line. In addition, the target object may include a road marking such as a temporary stop line, a pedestrian crossing sign, and the like, and may include a structure such as a signboard, a pole, a wall, a utility pole and the like. The host vehicle position estimation device 100 has a function of determining a deviation between the actual position of the target object and the information on the position of the target object on the map if there is the deviation between the actual position of the target object and the information on the position of the target object on the map due to redrawing of the demarcation line or the like.

Configuration of Host Vehicle Position Estimation Device in First Embodiment

As illustrated in FIG. 1, the host vehicle position estimation, device 100 includes an electronic control unit (ECU) 10 that performs overall management of the device. The ECU 10 is an electronic control unit including a central processing unit (CPU), read only memory (ROM), random access memory (RAM), a controller area network (CAN) communication circuit, and the like. In the ECU 10, various kinds of vehicle control are performed by loading the program stored in the ROM into the RAM and executing the program by the CPU. The ECU 10 may be configured with a plurality of electronic control units.

The ECU 10 is connected to a GPS receiver 1, an external sensor 2, an internal sensor 3, a map database 4, a target object database 5, and a communication unit 6.

The GPS receiver 1 is a measurement unit that measures a position of the host vehicle on the map (for example, latitude and longitude of the host vehicle) by receiving signals from equal to or more than three GPS satellites. The GPS receiver 1 transmits information on the measured position of the host vehicle to the ECU 10.

The external sensor 2 is a detection device that is mounted on the vehicle and detects a situation around the vehicle. The external sensor 2 includes a long-range camera 21, a short-range camera 22, a rear camera 23, and a radar sensor 24. The long-range camera 21, the short-range camera 22, and the rear camera 23 are imaging devices that image the surroundings of the host vehicle. The long-range camera 21 and the short-range camera 22 are provided, for example, on the back side of the windshield of the host vehicle and image the front of the host vehicle. The rear camera 23 is provided on the back side of the rear glass of the host vehicle, for example, and images the rearward of the host vehicle. Each camera may be a monocular camera or may be a stereo camera.

The long-range camera 21 images a first recognition range set in advance in front of the host vehicle. The short-range camera 22 images a second recognition range preset set in advance in front of the host vehicle. The first recognition range and the second recognition range mean the ranges on the road surface (on the ground). The surroundings of the host vehicle means a region within a certain distance from the host vehicle, for example. A certain distance is not particularly limited. A certain distance may be 50 m or 100 m. The second recognition range is set to a position that does not overlap with the first recognition range around the host vehicle and is closer to the host vehicle than the first recognition range. In other words, the first recognition range is the range set on a position farther than the second recognition range in front of the host vehicle.

The first recognition range does not need to be a range that matches an area imaged by the long-range camera 21, but may be a range corresponding to a part of the area imaged by the long-range camera 21. Similarly, the second recognition range does not need to be a range that matches an imaging area of the short-range camera 22, but may be a range corresponding to a part of the imaging area of the short-range camera 22.

Figure 2A:
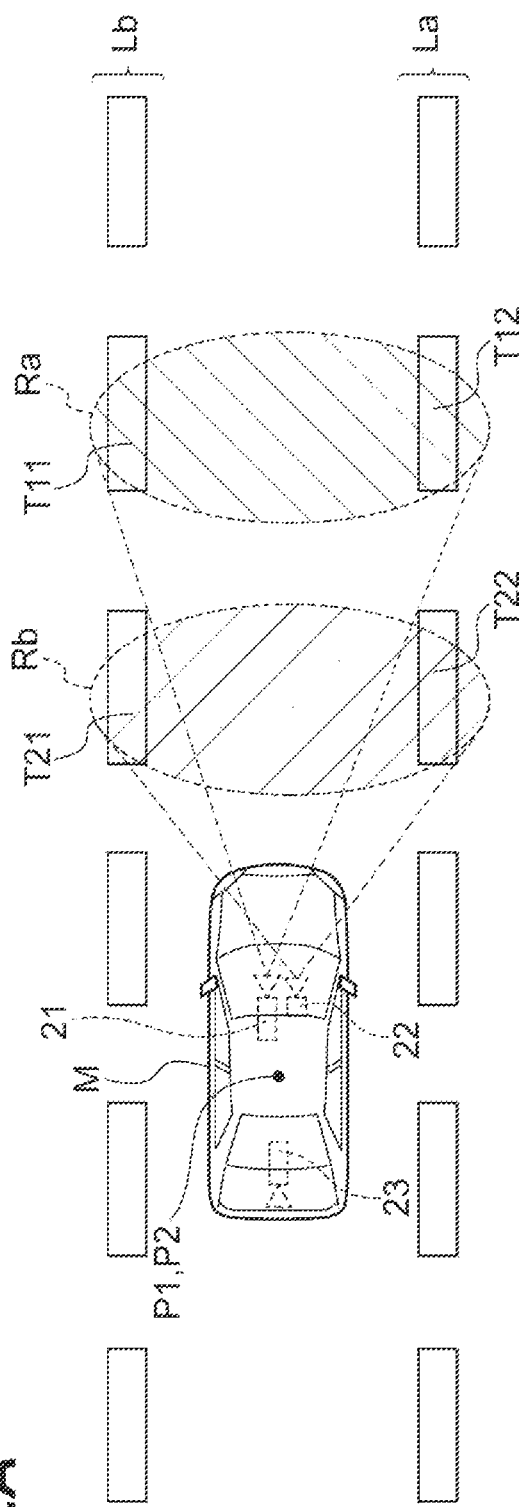
FIG. 2A is a plan view explaining an example of a first recognition range and a second recognition range.

FIG. 2A is a plan view explaining an example of the first recognition range and the second recognition range. In FIG. 2A, a host vehicle M, a dashed right side demarcation line La positioned at the right side of the host vehicle M, a dashed left side demarcation line Lb positioned at the left side of the host vehicle M, a first recognition range Ra, and a second recognition range Rb are illustrated. The first recognition range Ra and the second recognition range Rb illustrated in FIG. 2A are horizontally elongated oval shaped ranges including a part of the right side demarcation line La and the left side demarcation line Lb in the width direction of the host vehicle M. Reference signs P1 and P2 and reference signs T11 to T22 will be described later.

The radar sensor 24 illustrated in FIG. 1 is a detection device that detects an object around the host vehicle using radio waves (for example, millimeter waves) or light. The radar sensor 24 includes, for example, millimeter wave radar or LIDAR (Light Detection and Ranging). The radar sensor 24 transmits the radio wave or light to the surroundings of the host vehicle, and detects an object by receiving the radio waves or light reflected from the object. The radar sensor 24 transmits information on the detected object to the ECU 10. The radar sensor 24 may be configured with a plurality of sensors including both the millimeter wave radar and the LIDAR. The ECU 10 does not necessarily need to be connected to the radar sensor 24.

The internal sensor 3 is a detection device that detects a travel state of the host vehicle. The internal sensor 3 includes a vehicle speed sensor, an accelerator sensor, and a yaw rate sensor. The vehicle speed sensor is a measurement device that measures a speed of the host vehicle. As the vehicle speed sensor, for example, a vehicle wheel speed sensor is used, which is provided on vehicle wheels of the host vehicle or on a drive shaft rotating integrally with vehicle wheels, and measures a rotational speed of the vehicle wheels. The vehicle speed sensor transmits the measured vehicle speed information vehicle wheel speed information) to the ECU 10.

The accelerator sensor is a measurement device that measures an acceleration of the host vehicle. The accelerator sensor includes, for example, a longitudinal accelerator sensor that measures acceleration in the longitudinal direction of the host vehicle and a lateral accelerator sensor that measures a lateral acceleration of the host vehicle. The accelerator sensor transmits, for example, information on the acceleration of the host vehicle to the ECU 10. The yaw rate sensor is a measurement device that measures a yaw rate (a rotation angular velocity) around the vertical axis at the center of gravity of the host vehicle. As the yaw rate sensor, for example, a Gyro sensor can be used. The yaw rate sensor transmits the information on the measured yaw rate of the host vehicle to the ECU 10.

The result of detection (the vehicle speed information or the yaw rate information) performed by the internal sensor 3 may be used for the measurement of the position of the host vehicle on the map. In this case, the internal sensor 3 functions as a measurement unit of the position of the host vehicle on the map. The ECU 10 does not necessarily need to be connected to the internal sensor 3.

The map database 4 is a database that stores map information. The map database 4 is formed, for example, in a hard disk drive (HDD) mounted on the host vehicle. The map information includes information on the position of the road (position information on the lane), information on the shape of the road (for example, types of curves or straight road section, a curvature of the curve, or the like), information on the position of the intersection and the branch, and the like. The map database 4 may be formed in a server that can communicate with the host vehicle.

The target object database 5 is a database that stores data relating to the target object. Feature information (a shape and the like) for specifying the target object and information on the position of the target object on the map are stored in the target object database 5. The information on the position of the target object on the map is associated with the map information in the map database 4. The target object may be a part of the object. The target object may be, for example, a part of the demarcation line partitioned in the extending direction. In addition, the target object may be one edge (an end edge) of the demarcation line in the width direction partitioned in the extending direction. The target object database 5 may be a database integrated with the map database 4. In addition, the target object database 5 may be formed in a server that can communicate with the host vehicle.

The communication unit 6 is a device that transmits and receives various kinds of information via a wireless network (for example, the Internet and vehicle information and communication system (VICS®)). The communication form is not particularly limited. The communication unit 6 may transmit and receives the map information to and from a server in a management center which collectively manages the map information on a plurality of vehicles, for example. The ECU 10 does not necessarily need to be connected to the communication unit 6.

Next, a functional configuration of the ECU 10 will be described. The ECU 10 includes a measured position acquisition unit 11, a detected position recognition unit 12, a host vehicle first position estimation unit 13, a host vehicle second position estimation unit 14, a deviation determination unit 15, a reliability calculation unit 16, a deviation section recognition unit 17, a recognition range change unit 18, and an erroneous detection determination unit 19. A part of the functions of the ECU 10 described below may be performed by a server that can communicate with the host vehicle.

Based on the information on the position of the host vehicle measured by the GPS receiver 1, the measured position acquisition unit 11 acquires the measured position which is the position of the host vehicle on the map. The measured position acquisition unit 11 may acquire the measured position of the host vehicle from the history of the vehicle speed of the host vehicle (or the history of the rotation speed of the wheel) and the history of the yaw rate of the host vehicle, based on the result of detection performed by the internal sensor 3. In other words, the measured position acquisition unit 11 may acquire the measured position of the host vehicle by so-called odometry.

Based on the result of detection performed by the external sensor 2, the detected position recognition unit 12 recognizes the detected position of the first target object which is a target object included in the first recognition range Ra and the detected position of the second target object which is the target object included in the second recognition range Rb that does not overlap with the first recognition range Ra around the host vehicle. The detected position means an actual position of the target object (a relative position) with respect to the host vehicle recognized from the result of detection performed by the external sensor 2.

In FIG. 2A, the first target objects T11 and T12 and the second target objects T21 and T22 are illustrated. The first target object T11 is a part of the right side demarcation line La, which is included in the first recognition range Ra. The first target object T12 is a part of the left side demarcation line Lb, which is included in the first recognition range Ra. The second target object. T21 is a part of the right side demarcation line La., which is included in the second recognition range Rb. The second target object T22 is a part of the left side demarcation line Lb, which is included in the second recognition range Rb.

In the situation illustrated in FIG. 2A, the detected position recognition unit 12 recognizes the detected position of the first target objects T11 and T12 and the detected position of the second target objects T21 and T22 based on the result of detection performed by the external sensor 2. Specifically, the detected position recognition unit 12 recognizes the detected positions of the first target objects T11 and T12 by performing image processing such as edge processing or pattern matching based on the image captured by the long-range camera 21. In addition, the detected position recognition unit 12 recognizes the detected positions of the second target objects T21 and T22 by performing the image processing such as the edge processing or the pattern matching based on the image captured by the short-range camera 22.

The host vehicle first position estimation unit 13 estimates a host vehicle first position based on the detected position of the first target object recognized by the detected position recognition unit 12 and the information on the position of the first target object on the map stored in the target object database 5. The host vehicle first position means a position of the host vehicle on the map estimated using the first target object included in the first recognition range.

The host vehicle first position estimation unit 13 narrows down a candidate of the first target object from the target objects stored in the target object database 5 based on, for example, the measured position of the host vehicle measured by the position acquisition unit 11, and specifies a first target object from the feature (shape and the like) of the first target object recognized by the detected position recognition unit 12 and the feature information on the candidate of the first target object. The host vehicle first position estimation unit 13 estimates the host vehicle first position by matching (collating) the detected position of the first target object (the relative position with respect to the host vehicle) with the information on the position of the first target object on the map. Matching is performed, for example, by a least square matching method.

The host vehicle first position estimation unit 13 does not necessarily need to use the measured position (the position of the host vehicle resulting from the position information from the UPS receiver 1), and may specify the first target object using the host vehicle first position estimated immediately before. The host vehicle first position estimation unit 13 may specify the information on the position of the first target object on the map by acquiring the position of the host vehicle through a roadside-vehicle communication using optical beacons, or may specify the information on the position of the first target object on the map using other methods.

A host vehicle first position P1 is illustrated in FIG. 2A. Here, in FIG. 2A, a situation is illustrated, in Which there is no deviation between the actual position of the target object (the right side demarcation line La and the left side demarcation line Lb) and the information on the position of the target object on the map. In this case, the host vehicle first position estimation unit 13 estimates the host vehicle first position P1 by matching the detected position of the first target objects T11 and T12 with the position information of the first target objects T11 and T12 on the map.

The host vehicle second position estimation unit 14 estimates the host vehicle second position based on the detected position of the second target object recognized by the detected position recognition unit 12 and the information on the position of the second target object on the map stored in the target object database 5. The host vehicle second position means a position of the host vehicle on the map estimated using the second target object included in the second recognition range. Similarly to the host vehicle first position estimation unit 13, the host vehicle second position estimation unit 14 estimates the host vehicle second position by matching the detected position of the second target object with the information on the position of the second target object on the map.

A host vehicle second position P2 is illustrated in FIG. 2A. In FIG. 2A, since there is no deviation between the actual position of the target object and information on the position of the target object on the map, the host vehicle first position P1 and the host vehicle second position P2 are at the same position. In the situation in FIG. 2A, the host vehicle second position estimation unit 14 estimates the host vehicle second position P2 by matching the detected position of the second target objects T21 and 122 with the position information on the map of the second target objects T21 and T22.

Figure 2B:
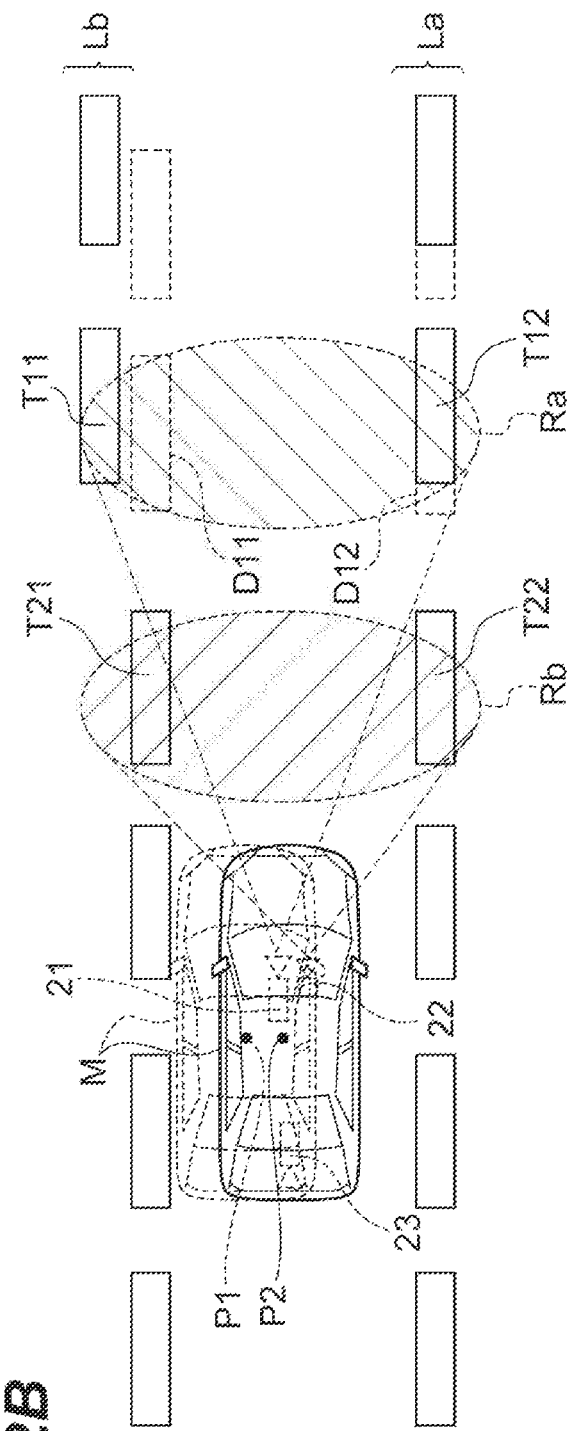
FIG. 2B is a plan view illustrating an example in which there is a deviation between an actual position of a target object and information on the position of the target object on a map.

FIG. 2B is a plan view illustrating an example in which there is a deviation between the actual position of the target object and the information on the position of the target object on the map. In FIG. 2B, position information D11 on the map corresponding to the first target object T11 and position information D12 on the map corresponding to the first target object T12 are illustrated. In FIG. 2B, the actual position of the first target objects T11 and T12 and the position information items D11 and D12 on the map deviate each other because the demarcation line is repainted due to the expansion of the lane width. The second target objects T21 and T22 are not the target of repainting, and thus, there is no deviation between the actual positions of the second target objects T21 and T22 and the position information on the map.

In the situation in FIG. 2B, the host vehicle first position estimation unit 13 estimates the host vehicle first position P1 by matching the detected position of the first target objects T11 and T12 with the position information items D11 and D12 on the map. The host vehicle first position estimation unit 13 estimates the position of the host vehicle in which the detected position of the first target objects T11 and T12 most closely match with the position information items D11 and D12 on the map as the host vehicle first position P1.

The host vehicle first position P1 in the situation of FIG. 2B is different from the host vehicle second position P2 due to the deviation between the actual position of the first target objects T11 and T12 and the position information items D11 and D12 on the map. The host vehicle second position P2 is the same position in FIG. 2A and FIG. 2B.

If a distance between the host vehicle first position and the host vehicle second position is equal to or greater than a deviation threshold value, the deviation determination unit 15 determines that there is the deviation between the detected position of the target object and the information on the position of the target object on the map. The distance between the host vehicle first position and the host vehicle second position means a direct distance between the host vehicle first position and the host vehicle second position on the map. The deviation threshold value can be a value set in advance. The deviation threshold value may be a fixed value or may be a value varying according to various situations such as the vehicle speed of the host vehicle.

In the situation illustrated in FIG. 2A, since the distance between the host vehicle first position P1 and the host vehicle second position P2 is less than the deviation threshold value, the deviation determination unit 15 determines that there is no deviation between the detected position of the target object and the information on the position of the target object on the map. In the situation illustrated in FIG. 2B, since the distance between the host vehicle first position P1 and the host vehicle second position P2 is equal to or greater than the deviation threshold value, the deviation determination unit 15 determines that there is the deviation between the detected position of the target object and the information on the position of the target object on the map.

If it is determined by the deviation determination unit 15 that there is the deviation between the detected position of the target object and the information on the position of the target object on the map, the reliability calculation unit 16 calculates a reliability in the collation of the road surface image. The reliability in the collation of the road surface image includes the reliability of the target object to be matched.

If there is a high possibility of erroneous matching with a wrong target object, the reliability calculation unit 16 calculates the reliability in the collation of the road surface image as a low value. For example, if there is a curb (a curb extending along the demarcation line) near the demarcation line which is the first target object or the second target object, and if both the demarcation line and the curb are not recognized as the first target object or the second target object, since there is a high possibility of erroneously matching the demarcation line with the position information on the curb on the map, the reliability calculation unit 16 calculates the reliability as a low value compared to a case where there is no curb or the like in the vicinity. In this case, the reliability calculation unit 16 can calculate the reliability in the collation of the road surface image based on the map information, the position of the host vehicle on the map (the host vehicle first position or the host vehicle second position), and the result of recognition performed by the detected position recognition unit 12.

The reliability calculation unit 16 may calculate the reliability in the collation of the road surface image according to the possibility of erroneous matching with the wrong target object using other well-known methods. The reliability calculation unit 16 may calculate the reliability for each of the first recognition range and the second recognition range. In this case, the lower reliability can be used in the determination by the deviation section recognition unit 17 to be described later.

The deviation section recognition unit 17 recognizes the deviation section Which is a section in which there is a deviation between the detected position of the target object and the information on the position of the target object on the map. If the reliability in the collation of the road surface image calculated by the reliability calculation unit 16 is equal to or higher than the reliability threshold value, the deviation section recognition unit 17 stores the position of the host vehicle on the map at the time when the deviation determination unit 15 determines that there is the deviation as a deviation start point. The reliability threshold value is a value set in advance. Any One of the host vehicle first position or the host vehicle second position may be adopted as the position of the host vehicle on the map.

If the reliability in the collation of the road surface image is log, since there is a high possibility that the deviation determination unit 15 erroneously determines that there is a deviation due to the wrong target object, not because the actual position of the target object deviates from the information on the position of the target object on the map due to the construction or the like, the deviation section recognition unit 17 does not store the deviation start point when the reliability in the collation of the road surface image is less than the reliability threshold value. In this way, the deviation section recognition unit 17 can avoid the recognition of the deviation section based on the erroneous determination of the deviation.

After storing the deviation start point, the deviation section recognition unit 17 stores the position of the host vehicle on the map when the deviation determination unit 15 determines that there is no deviation as a deviation end point. The deviation section recognition unit 17 stores a section between the deviation start point and the deviation end point as a deviation section. The deviation section means a section in which the deviation determination unit 15 determines that there is a deviation between the detected position of the target object and the information on the position of the target object on the map.

Figure 3:
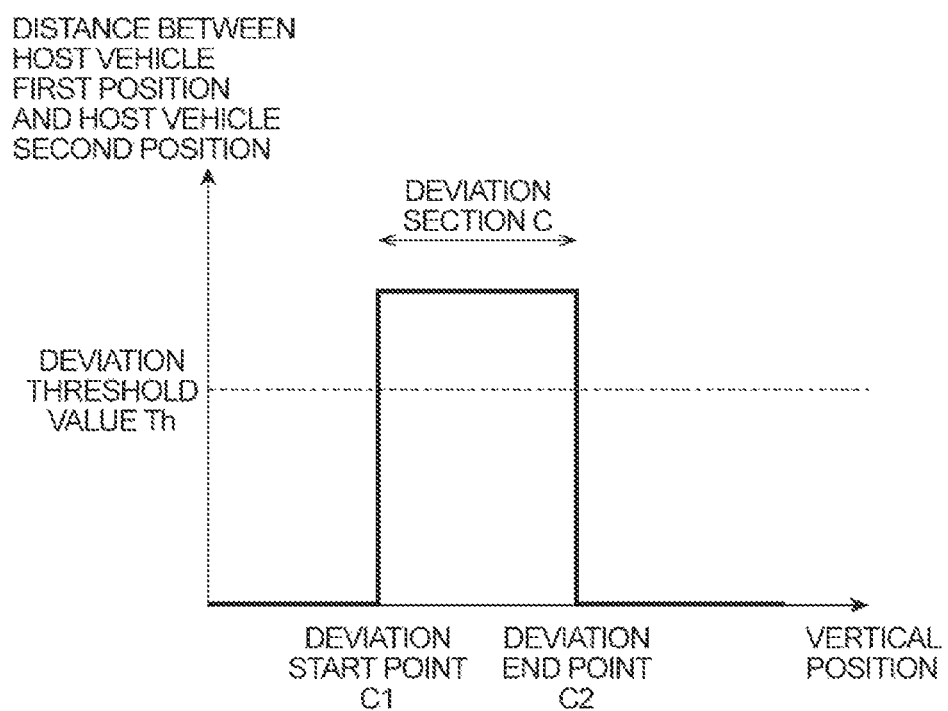
FIG. 3 is a graph for explaining a deviation section.

FIG. 3 is a graph for explaining the deviation section. A vertical axis in FIG. 3 represents the distance between the host vehicle first position and the host vehicle second position, and the horizontal axis represents the vertical position of the host vehicle (the position of the host vehicle in the extending direction of the lane). The deviation threshold value Th, the deviation start point C1, the deviation end point C2, and the deviation section C are illustrated in FIG. 3.

As illustrated in FIG. 3, when the first recognition range or the second recognition range reaches the deviation section due to the traveling of host vehicle, the distance between the host vehicle first position and the host vehicle second position increases and becomes equal to or greater than the deviation threshold value Th. At this time, if the reliability in the collation of the road surface image calculated by the reliability calculation unit 16 is equal to or higher than the reliability threshold value, the deviation section recognition unit 17 stores the position of the host vehicle on the map as the deviation start point C1.

Thereafter, when the first recognition range or the second recognition range is separated from the deviation section C due to the traveling of host vehicle, the deviation determination unit 15 determines that there is no deviation between the detected position of the target object and the information on the position of the target object on the map. The deviation section recognition unit 17 stores the position of the host vehicle on the map at the time when it is determined that there is no deviation, as the deviation end point C2.

The deviation section recognition unit 17 recognizes the section between the deviation start point C1 and the deviation end point C2 as the deviation section C. The deviation section recognition unit 17 transmits the deviation section information relating to the deviation section to the server in the management center through the communication unit 6. The deviation section recognition unit 17 may store the deviation section information in the target object database 5. The deviation section recognition unit 17 may lower the priority of estimating the host vehicle position using the target object in the deviation section C. The information of low priority estimation of the host vehicle position is not used, for example, when outputting the result of estimation of the host vehicle position to the external system.

If the recognition range of the first recognition range or the second recognition range is blocked by an obstacle or a weather condition, the recognition range change unit 18 changes the first recognition range or the second recognition range to a position not blocked by the obstacle or the weather conditions. The weather condition is a condition that hinders the recognition of the target object in the first recognition range or the second recognition range such as backlight. The obstacle is an object that hinders the recognition of the target object in the first recognition range or the second recognition range. The obstacle includes another traveling vehicle such as a preceding vehicle. The obstacles may include pedestrians, bicycles, stationary objects such as parked vehicle, cones for construction, and the like. In addition, if an abnormality is detected in the sensors (the camera or the radar sensor) used for recognition of the first recognition range or the second recognition range, the recognition range change unit 18 may switch the recognition range to the recognition range using the sensors from which the abnormality is not detected.

Figure 4:
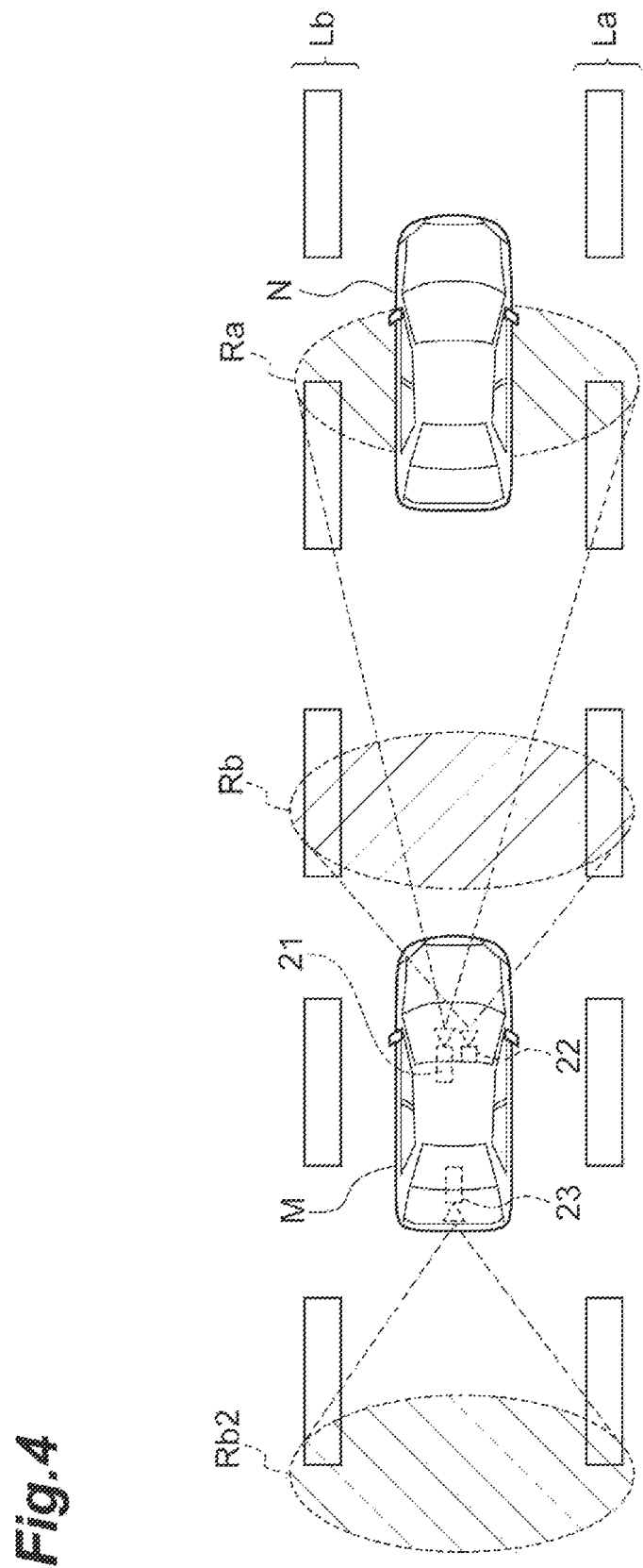
FIG. 4 is a plan view illustrating an example of a case where the first recognition range is blocked by a preceding vehicle.

FIG. 4 is a plan view illustrating an example of a case where the first recognition range is blocked by a preceding vehicle. A preceding vehicle N and a first recognition range Ra2 after the position is changed are illustrated in FIG. 4. In the situation in FIG. 4, the recognition range change unit 18 determines Whether or not the first recognition range Ra is blocked by an obstacle based on the result of detection performed by the external sensor 2 (for example, the image captured by the long-range camera 21). The recognition range change unit 18 may determine whether or not the first recognition range Ra is blocked by the obstacle based on the result of detection performed by the radar sensor 24.

If it is determined that the first recognition range Ra is blocked by the obstacle, the recognition range change unit 18 changes the first recognition range Ra to the first recognition range Ra2 at the position behind the host vehicle M. The first recognition range Ra2 behind the host vehicle M is a range imaged by the rear camera 23. The first recognition range Ra2 does not need to be a range that matches with the area imaged by the rear camera 23, but may be a part of a range of the area imaged by the rear camera 23. The first recognition range Ra2 is a range having the shape same as the first recognition range Ra.

Similarly, if it is determined that the second recognition range Rb is blocked by a motorcycle or the like based on the result of detection performed by the external sensor 2 (for example, an image captured by the short-range camera 22), the recognition range change unit 18 may change the second recognition range Rb to a position behind, the host vehicle M (for example, the position of the first recognition range Ra2 in FIG. 4).

If a side camera that images the side of host vehicle M is provided in the host vehicle M, the recognition range change unit 18 may change the first recognition range Ra or the second recognition range Rb to a range imaged by the side camera. The range imaged by the side camera will be described later. In addition, the recognition range change unit 18 may change (adjust) the position of the recognition range without switching the camera. In the situation illustrated in FIG. 4, the recognition range change unit 18 may change the first recognition range Ra to a position close to the host vehicle M side (a position close to the second recognition range Rb) so as not to overlap the preceding vehicle N. The recognition range change unit 18 may change the position of the first recognition range Ra by changing the direction of the long-range camera 21. If the first recognition range Ra is a part of the area imaged by the long-range camera 21, the recognition range change unit 18 may adjust the position of the first recognition range Ra within the area imaged by the long-range camera 21. The same is applied to the second recognition range Rb.

If the first recognition range is set at the position in front of the host vehicle with respect to the second recognition range, the erroneous detection determination unit 19 determines whether or not an erroneous detection occurs based on the first target object in the past first recognition range and the second target object in the second recognition range. That is, if the first recognition range is set at the position in front of the host vehicle with respect to the second recognition range, the second recognition range overlaps the past first recognition range due to the straight forward traveling of the host vehicle, and thus, it can be considered that the target object same as the past first target object is recognized as the second target object. In this case, when the second target object that that is recognized as the same target object is different from the past first target object, there is a possibility that an erroneous detection may occur due to a failure of the long-range camera 21 or the short-range camera 22, or an abnormality of the target object recognition algorithm, or the like.

Specifically, the erroneous detection determination unit 19 determines whether or not the host vehicle is traveling straight forward based on the result of detection performed by the internal sensor 3 (the yaw rate of the host vehicle). If it is determined that the host vehicle is traveling straight forward, the erroneous detection determination unit 19 specifies the past first recognition range to be compared with the current second recognition range based on the positional relationship between the first recognition range and the second recognition range and the result of detection performed by the internal sensor 3 (vehicle speed of host vehicle). The erroneous detection determination unit 19 specifies that the first recognition range of 0.5 seconds before is to be compared, for example, since the vehicle speed of the host vehicle is constant.

In this case, the erroneous detection determination unit 19 determines whether or not the second target object in the second recognition range is different from the first target object in the first recognition range of 0.5 seconds before based on the result of recognition performed by the detected position recognition unit 12. If the second target object in the current second recognition range matches with the first target object in the first recognition range of 0.5 seconds before, the erroneous detection determination unit 19 determines that the erroneous detection occurs. If the second target object in the current second recognition range is different from the first target object in the first recognition range of 0.5 seconds before, the erroneous detection determination unit 19 determines that the erroneous detection occurs.

The case where the second target object is different from the past first target object means a case where, for example, the temporary stop line is recognized as the second target object even though the temporary stop line is not recognized as the past first target object. The case where the second target object is different from the past first target object may include a case where the positional relationship of a plurality of target objects recognized as the past first target object is different from the positional relationship of a plurality of target objects recognized as the second target object (for example, a case where a distance between the utility pole and the demarcation line deviates by equal to or more than a certain distance in the case of the first target object and the case of the second target object).

If it is determined that the erroneous detection occurs, the erroneous detection determination unit 19 may notify the driver of that fact. If it is determined that the erroneous detection occurs, the erroneous detection determination unit 19 may prohibit the deviation determination unit 15 from determining the deviation. The erroneous detection determination unit 19 may transmit the fact that the erroneous detection occurs to the various systems (automatic driving system, driving support system, or the like) mounted on the host vehicle. The erroneous detection determination unit 19 may compare the second target object in the past second recognition range with the first target object in the further past first recognition range, not in the current second recognition range.

Processing by Host Vehicle Position Estimation Device in First Embodiment

Next, the processing by the host vehicle position estimation device 100 in the first embodiment will be described with reference to the drawings.

Deviation Determination Processing

Figure 5:
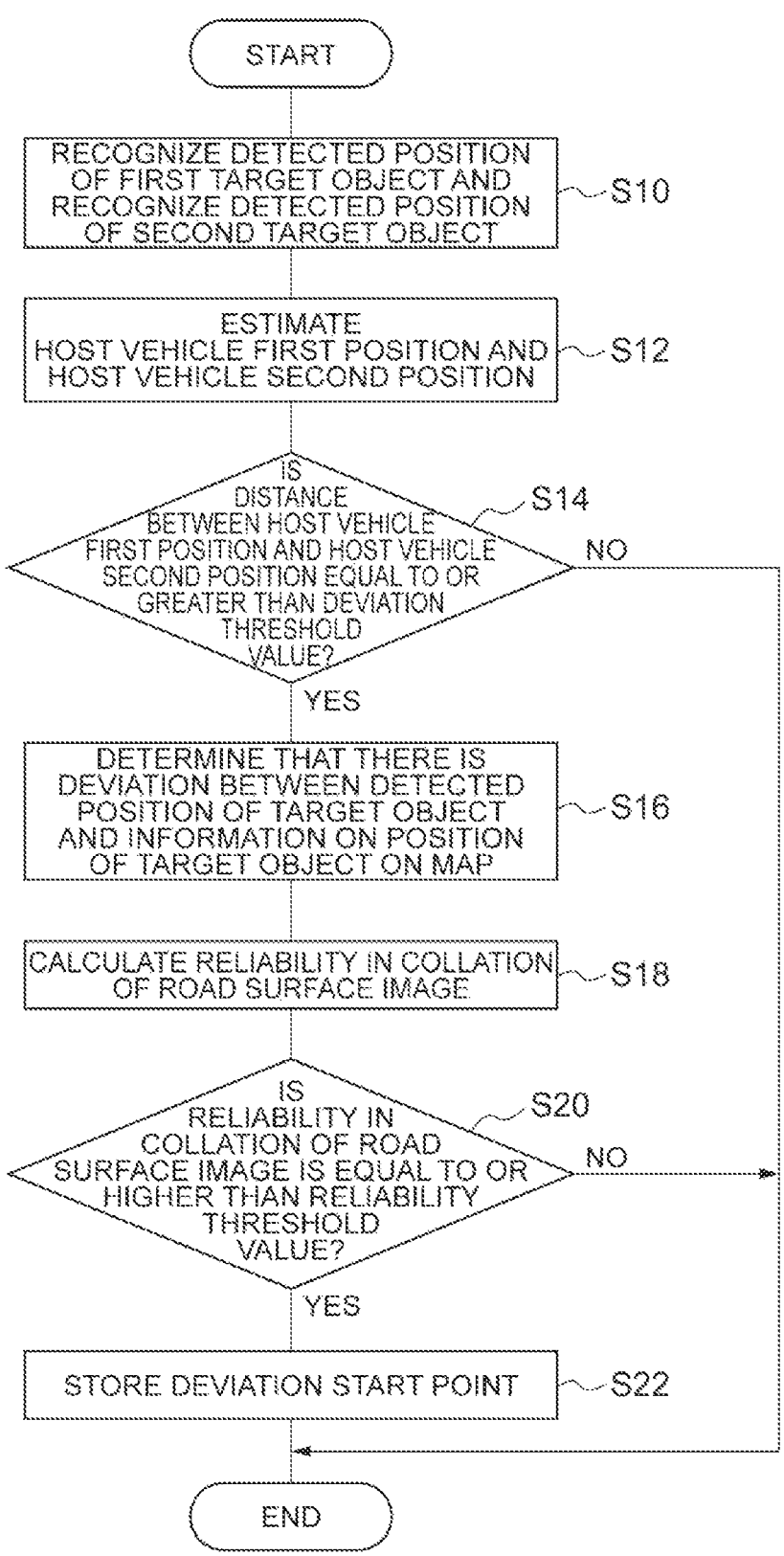
FIG. 5 is a flowchart illustrating deviation determination processing in the first embodiment.

FIG. 5 is a flowchart illustrating the deviation determination processing in the first embodiment. The processing in the flowchart illustrated in FIG. 5 is executed, for example, while the host vehicle is traveling.

As illustrated in FIG. 5, as S10, the ECU 10 of the host vehicle position estimation device 100 recognizes the detected position of the first target object and recognizes the detected position of the second target object using the detected position recognition unit 12. The detected position recognition unit 12 recognizes the detected position of the first target object which is the target object included in the first recognition range Ra around the host vehicle M based on the image captured by the long-range camera 21. The detected position recognition unit 12 recognizes the detected position of the second target object Which is the target object included in the second recognition range Rb based on the image captured by the short-range camera 22. Thereafter, the ECU 10 makes the process proceed to S12:

In S12, the ECU 10 estimates the host vehicle first position using the host vehicle first position estimation unit 13. In addition, the ECU 10 estimates the host vehicle second position using the host vehicle second position estimation unit 14. The host vehicle first position estimation unit 13 estimates the host vehicle first position by matching the detected position of the first target object with the information on the position of the first target object on the map. Similarly to the host vehicle first position: estimation unit 13, the host vehicle second position estimation unit 14 estimates the host vehicle second position by matching the detected position of the second target object with the information on the position of the second target object on the map. Thereafter, the ECU 10 makes the process proceed to S14.

In S14, the ECU 10 determines whether or not the distance between the host vehicle first position and the host vehicle second position is equal to or greater than the deviation threshold value using the deviation determination unit 15. If it is determined that the distance between the host vehicle first position and the host vehicle second position is not equal to or greater than the deviation threshold value (NO in S14), the deviation determination unit 15 determines that there is no deviation between the detected position of the target object and the information on the position of the target object on the map, and then, ends the current processing. After a certain time elapsed, the ECU 10 repeats the processing from S10 again. If it is determined that the distance between the host vehicle first position and the host vehicle second position is equal to or greater than the deviation threshold value (YES in S14), the deviation determination unit 15 makes the process proceed to S16.

In S16, the ECU 10 determines that there is the deviation between the detected position of the target object and the information on the position of the target object on the map using the deviation determination unit 15. Thereafter, the ECU 10 makes the process proceed to S18.

In S18, the ECU 10 calculates the reliability in the collation of the road surface image using the reliability calculation unit 16. If there is a high possibility of erroneous matching with a wrong target object, the reliability calculation unit 16 calculates the reliability in the collation of the road surface image as a low value. Thereafter, the ECU 10 makes the process proceed to S20.

In S20, the ECU 10 determines whether or not the reliability in the collation of the road surface image is equal to or higher than the reliability threshold value using the deviation section recognition unit 17. If it is determined that the reliability in the collation of the road surface image is not equal to or higher than the reliability threshold value (NO in S20), the ECU 10 ends the current processing. After a certain time elapsed, the ECU 10 repeats the processing from S10 again. If it is determined that the reliability in the collation of the road surface image is equal to or higher than the reliability threshold value (YES in S20), the ECU 10 makes the process proceed to S22.

Figure 6:
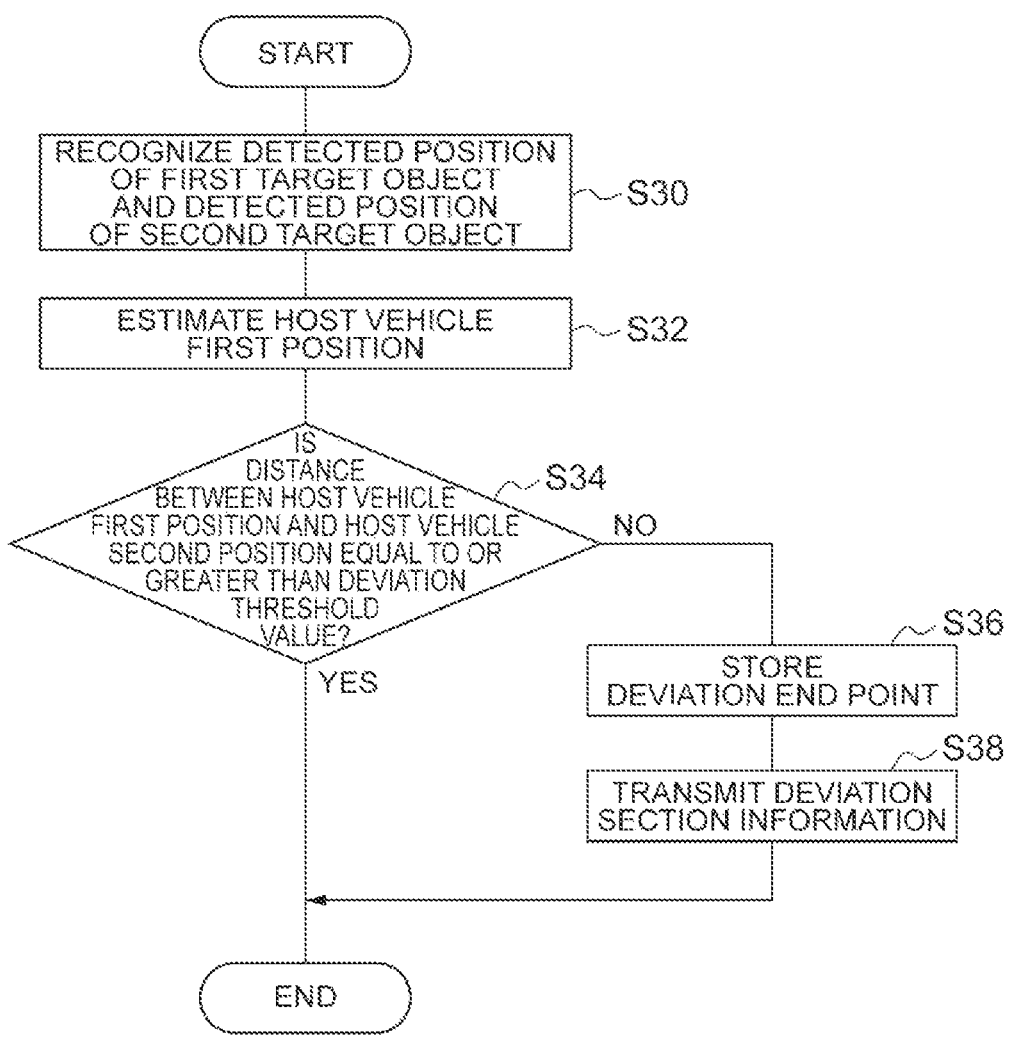
FIG. 6 is a flowchart illustrating deviation end determination processing in the first embodiment.

In S22, the ECU 10 stores the deviation start point using the deviation section recognition unit 17. The deviation section recognition unit 17 stores the host vehicle position (the host vehicle first position or the host vehicle second position) when it is determined by the deviation determination unit 15 that the distance between the host vehicle first position and the host vehicle second position is equal to or greater than the deviation threshold value as the deviation start point, Deviation End Determination Processing FIG. 6 is a flowchart illustrating the deviation end determination processing in the first embodiment. The processing in the flowchart illustrated in FIG. 6 is executed when the deviation start point is stored in S22 in FIG. 5. The processing items in S30, 532, and S34 in FIG. 6 is similar to the processing items in S10, S12, and S14 in FIG. 5 respectively, and thus, the description thereof will be made briefly.

As illustrated in FIG. 6, as S30, the ECU 10 recognizes the detected position of the first target object and recognizes the position of the second target object using detected position recognition unit 12. Thereafter, the ECU 10 makes the process proceed to 532. In 532, the ECU 10 estimates the host vehicle first position using the host vehicle first position estimation unit 13 and estimates the host vehicle second position using the host vehicle second position estimation unit 14. Thereafter, the ECU 10 makes the process proceed to S34.

In S34, the ECU 10 determines whether or not the distance between the host vehicle first position and the host vehicle second position is equal to or greater than the deviation threshold value using the deviation determination unit 15. If it is determined that the distance between the host vehicle first position and the host vehicle second position is equal to or greater than the deviation threshold value (YES in S34), the deviation determination unit 15 ends the current processing on the assumption that the deviation section continues. After a certain time elapsed, the ECU 10 repeats the processing from S30 again. If it is determined that the distance between the host vehicle first position and the host vehicle second position is not equal to or greater than the deviation threshold value (NO in S34), the deviation determination unit 15 makes the process proceed to S36.

In S36, the ECU 10 stores the deviation end point using the deviation section recognition unit 17. The deviation section recognition unit 17 stores the host vehicle position. (the host vehicle first position or the host vehicle second position) when it is determined by the deviation determination unit 15 that the distance between the host vehicle first position and the host vehicle second position is equal to or greater than the deviation threshold value as a deviation end point. The deviation section recognition unit 17 recognizes the section between the deviation start point and the deviation end point as the deviation section, Thereafter, the ECU 10 makes the process proceed to S38.

In S38, the ECU 10 transmits the deviation section information to the center using the deviation section recognition unit 17. The deviation section recognition unit 17 transmits the information relating to the deviation section to the server at the center that manages the map information through the communication unit 6. Thereafter, the ECU 10 ends the deviation end determination processing.

Erroneous Detection Determination Processing

Figure 7:
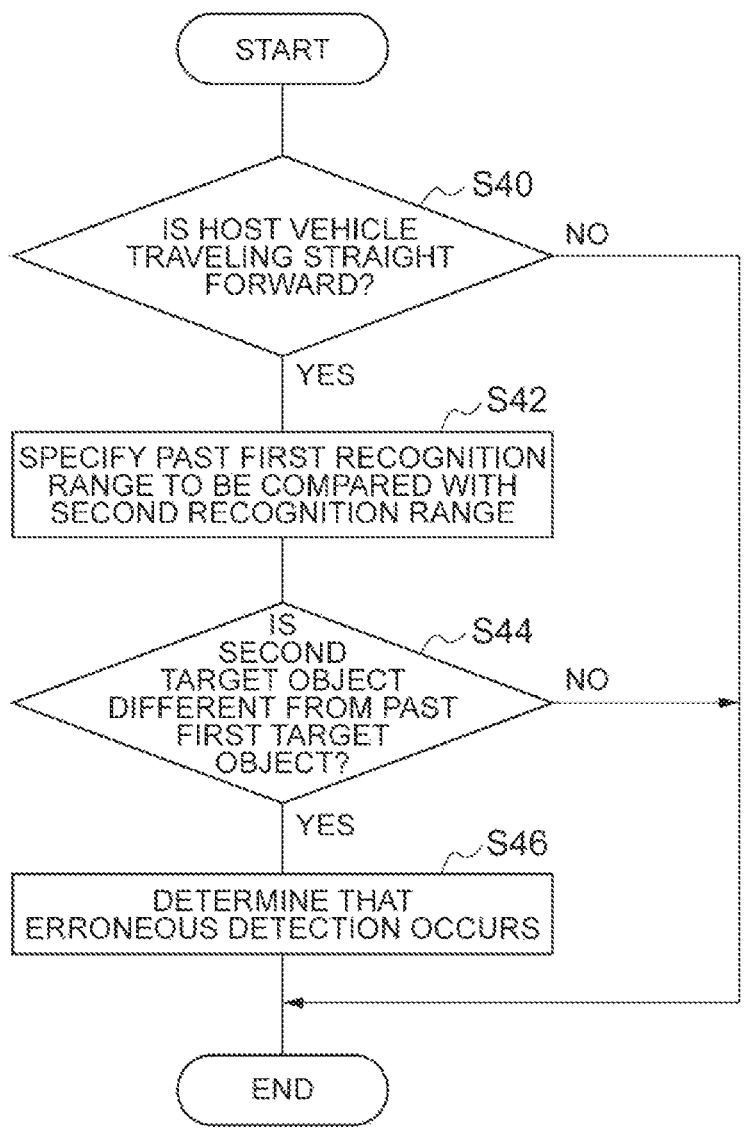
FIG. 7 is a flowchart illustrating erroneous detection determination processing in the first embodiment.

FIG. 7 is a flowchart illustrating the erroneous detection determination processing in the first embodiment. The flowchart illustrated in FIG. 7 is executed while the host vehicle is traveling.

As illustrated in FIG. 7, in S40, the ECU 10 determines whether or not the host vehicle is traveling straight forward using the erroneous detection determination unit 19. The erroneous detection determination unit 19 determines Whether or not the host vehicle is traveling straight forward based on the yaw rate of the host vehicle. If it is determined that the host vehicle is not traveling straight forward (NO in S40), the ECU 10 ends the current processing. After a certain time elapsed, the ECU 10 repeats the processing from S40 again. If it is determined that the host vehicle is traveling straight forward (YES in S40), the ECU 10 makes the process proceed to S42.

In S42, the ECU 10 specifies the past first recognition range to be compared with the current second recognition range using the erroneous detection determination unit 19. The erroneous detection determination unit 19 specifies the past first recognition range to be compared with the current second recognition range based on the positional relationship between the first recognition range and the second recognition range and vehicle speed of the host vehicle. Thereafter, the ECU 10 makes the process proceed to S44.

In S44, the ECU 10 determines whether or not the second target object is different from the past first target object using the erroneous detection determination unit 19. The erroneous detection determination unit 19 determines whether or not the current second target object is different from the past first target object based on the result of recognition performed by the detected position recognition unit 12. If it is determined that the current second target object is not different from the past first target object (NO in S44), the ECU 10 ends the current processing. After a certain time elapsed, the ECU 10 repeats the processing from S40 again. If it is determined that the current second target object is different from the past first target object (YES in S44), the ECU 10 makes the process proceed to S46.

In S46, the ECU 10 determines that the erroneous detection occurs using the erroneous detection determination unit 19. If it is determined that the erroneous detection occurs, the erroneous detection determination unit 19 may prohibit the deviation determination unit 15 from determining the deviation. After a certain time elapsed, the ECU 10 repeats the processing from S40 again.

According to the host vehicle position estimation device 100 in the first embodiment described above, the host vehicle first position is estimated from the detected position of the first target object included in the first recognition range around the host vehicle and the information on the position of the first target object on the map, and the host vehicle second position is estimated from the detected position of the second target object included in the second recognition range which does not overlap with the first recognition range and the information on the position of the second target object on the map, According to host vehicle position estimation device 100, since it can be considered that the distance between the host vehicle first position and the host vehicle second position is small if the actual position of the target object and the information on the position of the target object on the map match with each other, if the distance between the host vehicle first position and the host vehicle second position is equal to or greater than the deviation threshold value, it is determined that there is the deviation between the detected position of the target object and the information on the position of the target object on the map. Therefore, it is possible to appropriately determine the deviation between the actual position of the target object and the information on the position of the target object on the map.

In addition, according to host vehicle position estimation device 100, since the first recognition range and the second recognition range are set at positions aligned to the longitudinal direction of the host vehicle, it is possible to appropriately recognize the detected position of the target object such as the demarcation line extending along the lane in which the host vehicle is traveling. In addition, according to the host vehicle position estimation device 100, since the first target object in the first recognition range will not be detected as the second target object in the second recognition range due to the traveling of the host vehicle, it is possible to confirm the detection of the target Object. Furthermore, in the host vehicle position estimation device 100, by comparing the second target object in the second recognition range with the first target object in the past first recognition range, it is possible to appropriately determine whether or not the erroneous detection occurs using the erroneous detection determination unit 19.

Second Embodiment

Figure 8:
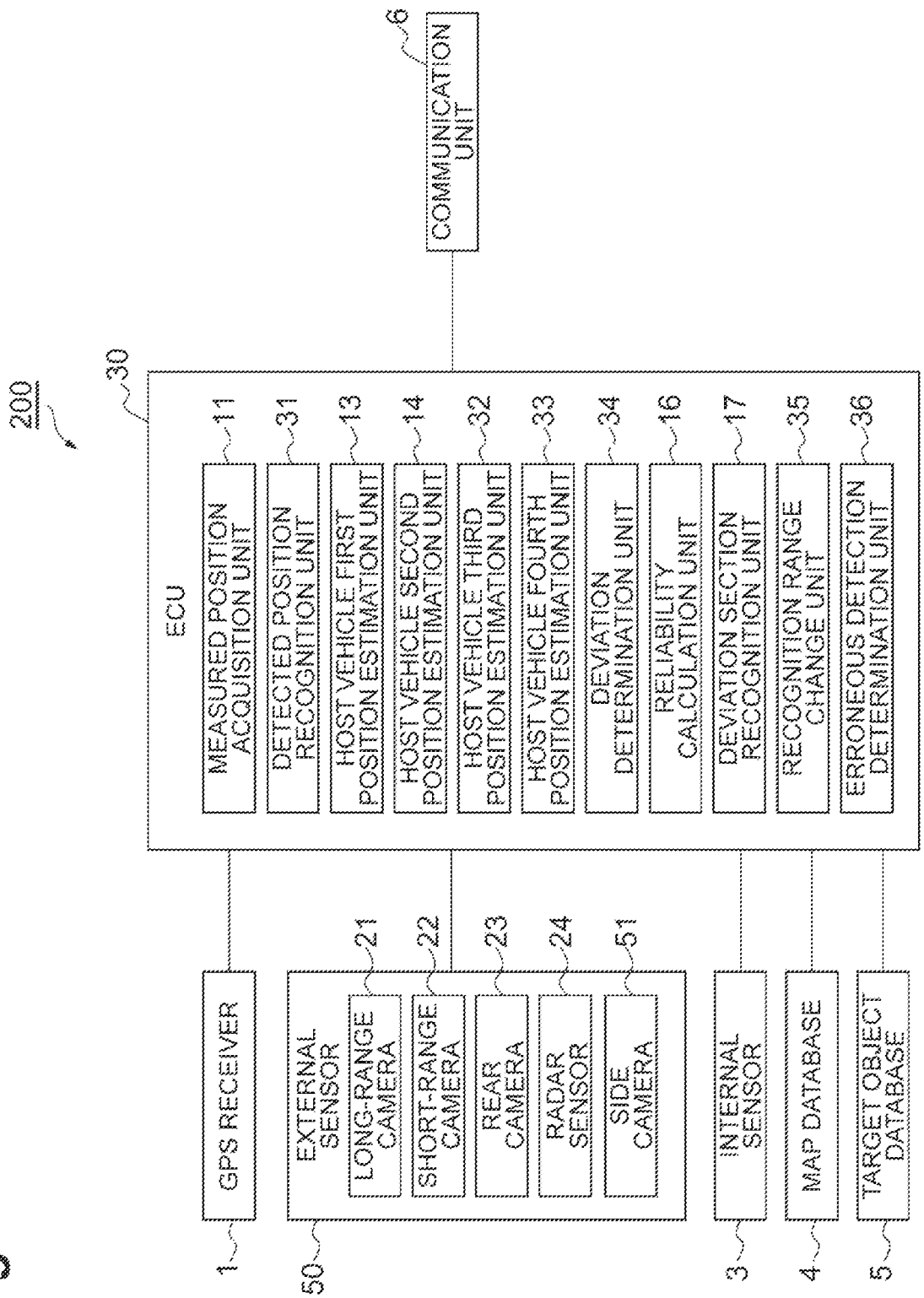
FIG. 8 is a block diagram illustrating a host vehicle position estimation device in a second embodiment.

Next, a host vehicle position estimation device in a second embodiment will be described with reference to the drawings. FIG. 8 is a block diagram illustrating the host vehicle position estimation device in the second embodiment. A host vehicle position estimation device 200 illustrated in FIG. 8 is mainly different from that in the first embodiment in a point that a third recognition range and a fourth recognition range are used in addition to the first recognition range and the second recognition range. The same reference signs will be given to the same configuration elements as in the first embodiment, and the description thereof will be omitted.

As illustrated in FIG. 8, the ECU 20 of the host vehicle position estimation device 200 is connected to the external sensor 50. The external sensor 50 is different from the external sensor 2 in the first embodiment only in a point that a side camera 51 is included therein. In addition, the ECU 20 is different from the ECU 10 in the first embodiment only in points that a host vehicle third position estimation unit 32 and a host vehicle fourth position estimation unit 33 are included therein and that the functions of a detected position recognition unit 31, a deviation determination unit 34, and an erroneous detection determination unit 36 are different from those in the ECU 10 in the first embodiment.

Figure 9:
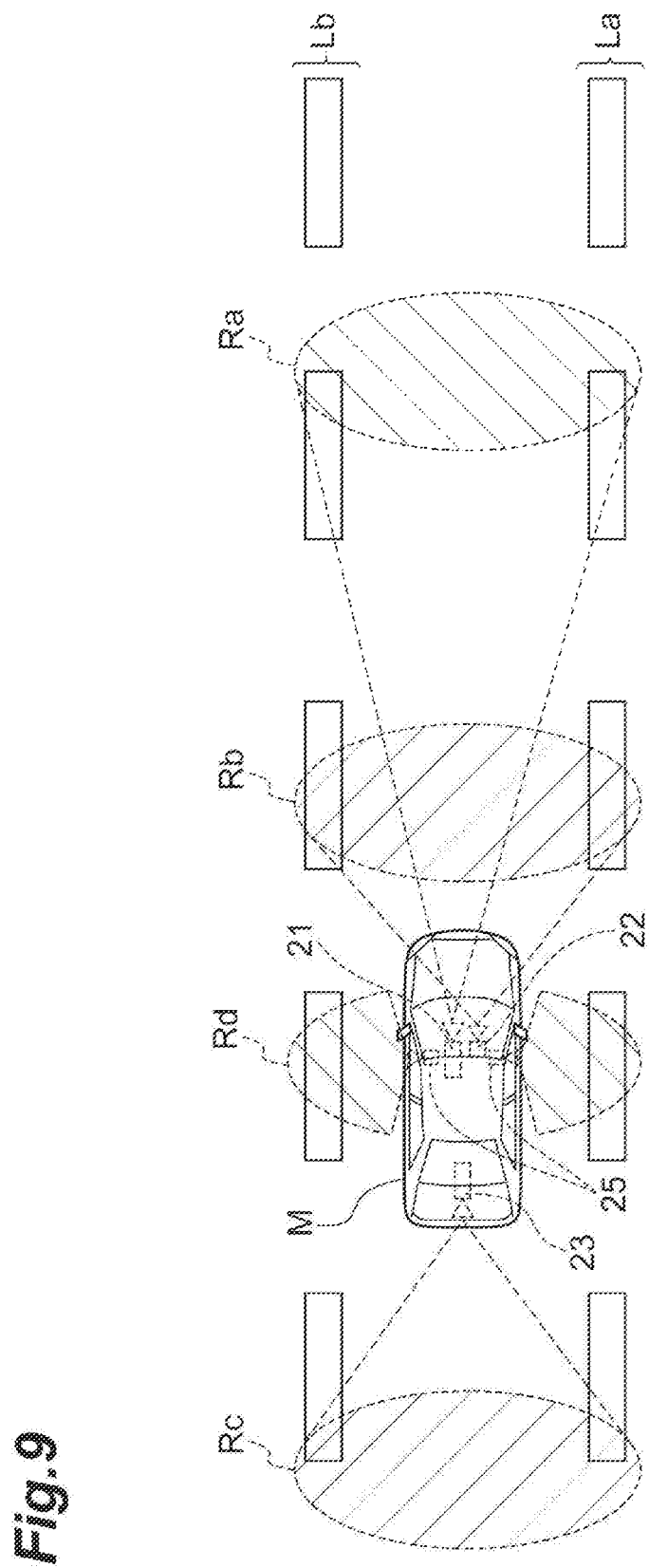
FIG. 9 is a plan view for explaining a first recognition range, a second recognition range, a third recognition range, and a fourth recognition range.

Here, FIG. 9 is a plan view for explaining the first recognition range, the second recognition range, the third recognition range, and the fourth recognition range. In FIG. 9, a pair of right and left side cameras 51, a third recognition range Re, and a fourth recognition range Rd are illustrated.

As illustrated in FIG. 9, the third recognition range Re is a range imaged by the rear camera 23. The third recognition range Re does not need to be a range that matches the area imaged by the rear camera 23, but may be a range corresponding to a part of the area imaged by the rear camera 23. The third recognition range Re is set to be positioned behind the host vehicle M with respect to the first recognition range Ra. The third recognition range Re is, for example, a range having the shape same as the first recognition range Ra and the second recognition range Rb (oval shaped range in this case).

The fourth recognition range Rd is a range that is imaged by the pair of left and right side cameras 51 and is set at the side of the host vehicle M. The fourth recognition range Rd is divided into two left and right ranges with the host vehicle NI as a reference. The fourth recognition range Rd does not need to be a range that matches the area imaged by the side cameras 51, but may be a range corresponding to a part of the area imaged by the side cameras 51.

The first recognition range Ra, the second recognition range Rb, the third recognition range Re, and the fourth recognition range Rd are positioned in an order of the first recognition range Ra, the second recognition range Rb, the fourth recognition range Rd, and the third recognition range Re in the direction from front to back of the host vehicle M.

In addition to the function in the first embodiment, the detected position recognition unit 31 recognizes the detected position of a third target object which is a target object included in the third recognition range Re. Similarly, the detected position recognition unit 31 recognizes the detected position of a fourth target object which is a target object included in the fourth recognition range Rd. The method of recognizing detected position or the like can be the same as that of recognizing the detected position of the first target object in the first embodiment.

The host vehicle third position estimation unit 32 estimates the host vehicle third position based on the detected position of the third target object and the information on the position of the third target object on the map included in the third recognition range Re.

Similarly, the host vehicle fourth position estimation unit 33 estimates the host vehicle fourth position based on the detected position of the fourth target object and the information on the fourth position of the target object on the map included in the fourth recognition range Rd. The method of estimating the host vehicle position can also be the same as that of recognizing the host vehicle first position in the first embodiment.

If the distance between any two of the host vehicle positions among the host vehicle first position, the host vehicle second position, the host vehicle third position, and the host vehicle fourth position is equal to or greater than the deviation threshold value, the deviation determination unit 34 determines that there is a deviation between the detected position of the target object and the information on the position of the target object on the map. If the distance between any two of the host vehicle positions among the host vehicle first position, the host vehicle second position, the host vehicle third position, and the host vehicle fourth position is not equal to or greater than the deviation threshold value (if the distance between any combinations of the two positions is less than the deviation threshold value), the deviation determination unit 34 determines that there is no deviation between the detected position of the target object and the information on the position of the target object on the map.

If any one of the first recognition range Ra, the second recognition range Rb, the third recognition range Re, and the fourth recognition range Rd are blocked by an obstacle, the recognition range change unit 35 changes the recognition range blocked by the obstacle to a position not blocked by an obstacle. The recognition range change unit 35 changes the recognition range to the position not blocked by the obstacle by adjusting the position of the recognition range. If any one of the first recognition range Ra, the second recognition range Rh, the third recognition range Re, and the fourth recognition range Rd are blocked by an obstacle and if the position adjustment is not possible, the recognition range change unit 35 may also prohibit the estimation of the host vehicle position in the recognition range from being performed.

In addition to the function in the first embodiment, the erroneous detection determination unit 36 determines Whether or not the erroneous detection occurs based on the first target object in the past first recognition range and the third target object in the third recognition range. The method of determination can be the same as that in the first embodiment.

The erroneous detection determination unit 36 may determine whether or not the erroneous detection occurs based on the detected position of the second target object in the past second recognition range past and the third target object in the third recognition range. The erroneous detection determination unit 36 may perform the determination based on the first target object in the past first recognition range and the fourth target object in the fourth recognition range, or may perform the determination based on the second target object in the past second recognition range and the fourth target object in the fourth recognition range. The erroneous detection determination unit 36 may perform the determination based on the fourth target object in the past fourth recognition range and the third target object in the third recognition range.

Processing by Host Vehicle Position Estimation Device in Second Embodiment

Subsequently, the processing by the host vehicle position estimation device 200 in the second embodiment will be described with reference to the drawings.

Deviation Determination Processing

Figure 10:
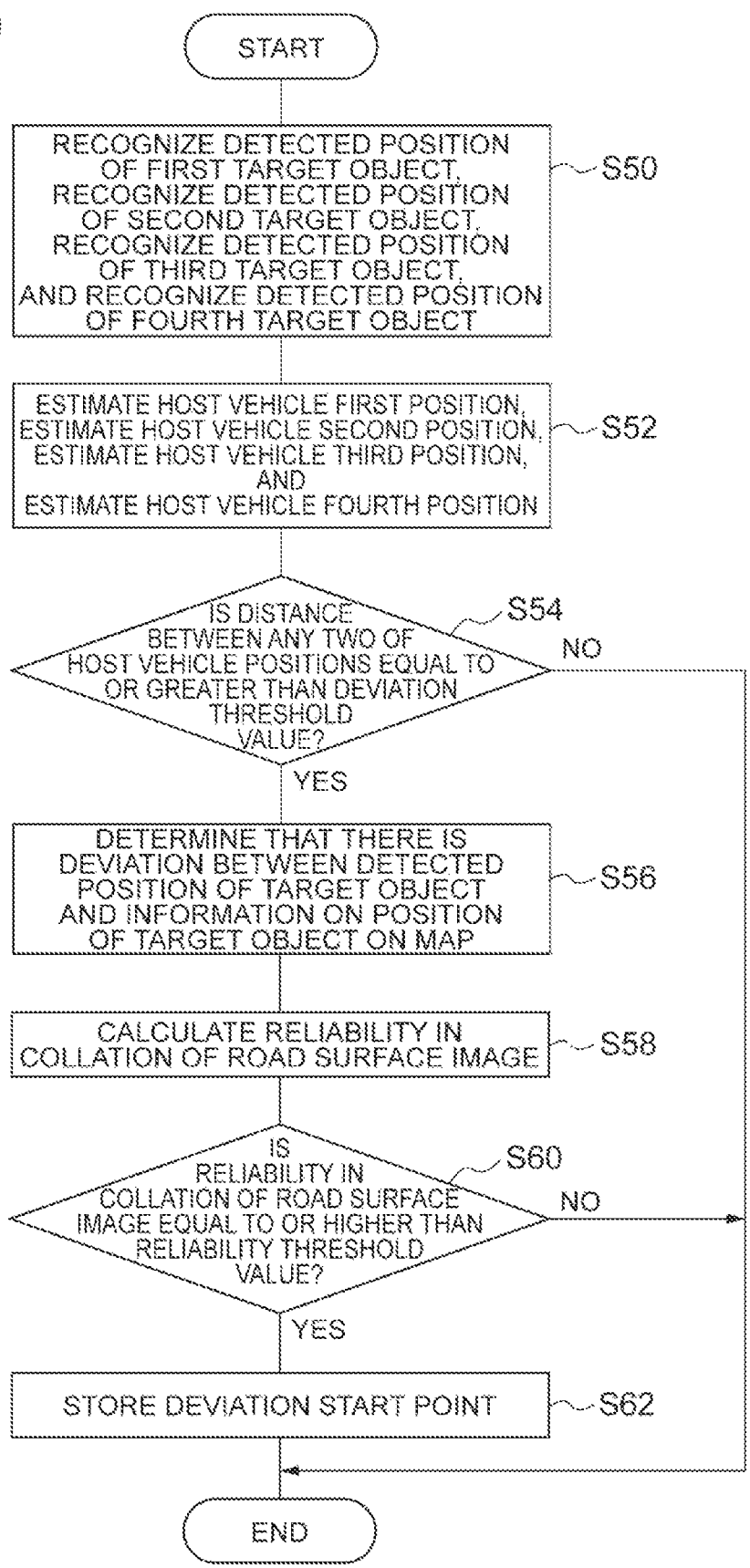
FIG. 10 is a flowchart illustrating deviation determination processing in the second, embodiment.

FIG. 10 is a flowchart illustrating the deviation determination processing in the second embodiment. The processing in the flowchart illustrated in FIG. 10 is executed, for example, while the host vehicle is traveling.

As illustrated in FIG. 10, as S50, the ECU 20 of the host vehicle position estimation device 200 recognizes the detected position of the first target object, the detected position of the second target object, the detected position of the third target object, and the detected position of the fourth target object using the detected position recognition unit 31. Thereafter, the ECU 20 makes the process proceed to S52.

In S52, the ECU 20 estimates the host vehicle first position using the host vehicle first position estimation unit 13 and estimates the host vehicle second position using the host vehicle second position estimation unit 14. Similarly, the ECU 20 estimates the host vehicle third position using the host vehicle third position estimation unit 32 and estimates the host vehicle fourth position using the host vehicle fourth position estimation unit 33. Thereafter, the ECU 20 makes the process proceed to S54.

In S54, the ECU 20 determines whether or not the distance between any two of the host vehicle positions is equal to or greater than the deviation threshold value using the deviation determination unit 34. If it is determined that the distance between any two of the host vehicle positions among the host vehicle first position, the host vehicle second position, the host vehicle third position, and the host vehicle fourth position is not equal to or greater than the deviation threshold value (NC) S54: NO), the ECU 20 ends the current processing. After a certain time elapsed, the ECU 20 repeats the processing from S50 again. If it is determined that the distance between any two of the host vehicle positions among the host vehicle first position, the host vehicle second position, the host vehicle third position, and the host vehicle fourth position is equal to or greater than the deviation threshold value (YES—S54: NO), the ECU 20 makes the process proceed to S56. Hereinafter, the processing items in S56, S58, S60, and S62 are respectively the same as processing items in S16, S18, S20, and S22 illustrated in FIG. 5, and the description thereof will be made briefly.

In S56, the ECU 20 determines that there is a deviation between the detected position of the target object and the information on the position of the target object on the map using the deviation determination unit 34. Thereafter, in S58, the ECU 20 calculates the reliability in the collation of the road surface image using the reliability calculation unit 16.

In S60, the ECU 20 determines whether or not the reliability in the collation of the road surface image is equal to or higher than the reliability threshold value using the deviation section recognition unit 17. If it is determined that the reliability in the collation of the road surface image is not equal to or higher than the reliability threshold value (NO in S60), The ECU 20 ends the current processing. After a certain time elapsed, the ECU 20 repeats the processing from S50 again. If it is determined that the reliability in the collation of the road surface image is equal to or higher than the reliability threshold value (YES in S60), the ECU 20 makes the process proceed to S62. In S62, the ECU 20 stores the deviation start point using the deviation section recognition unit 17.

Deviation End Determination Processing

FIG. 11 is a flowchart illustrating the deviation end determination processing in the second embodiment. The processing in the flowchart illustrated in FIG. 11 is executed when the deviation start point is stored in S62 in FIG. 10. The processing items in S70, S72, and S74 in FIG. 11 is similar to the processing items in S50, S52, and S54 in FIG. 10 respectively, and thus, the description thereof will be made briefly.

as illustrated hi FIG. 11, as S70, the ECU 20 recognizes the detected position of the first target object, recognizes the detected position of the second target object, recognizes the detected position of the third target object, and recognizes the detected position of the fourth target object using the detected position recognition unit 31. In S52, the ECU 20 estimates the host vehicle first position, the host vehicle second position, the host vehicle third position, and the host vehicle fourth position.

In S74, the ECU 20 determines whether or not the distance between any two of the host vehicle positions is equal to or greater than the deviation threshold value using the deviation determination unit 34. If it is determined that the distance between any two of the host vehicle positions is equal to or greater than the deviation threshold value (YES in S74), the ECU 20 ends the current processing. After a certain time elapsed, the ECU 20 repeats the processing from S70 again. If it is determined that the distance between any two of the host vehicle positions is not equal to or greater than the deviation threshold value (NO in S74), the ECU 20 makes the process proceed to S76. Hereafter, S76 and S78 are the same as S36 and S38 in FIG. 6 respectively, and the description thereof will be made briefly.

In S76, the ECU 20 stores the deviation end point using the deviation section recognition unit 17. Thereafter, in S78, the ECU 20 transmits the deviation section information to the center using the deviation section recognition unit 17. Thereafter, the ECU 20 ends the deviation end determination processing.

According to the host vehicle position estimation device 200 in the second embodiment described above, it is possible to appropriate determine whether or not there is a deviation between the detected position of the target object and the information on the position of the target object on the map using the first recognition range Ra, the second recognition range Rb, the third recognition range Re, and the fourth recognition range Rd. That is, in the host vehicle position estimation device 200, since it can be considered that all the distances between any two of the host vehicle positions among the host vehicle first position, the host vehicle second position, the host vehicle third position, and the host vehicle fourth position are small if the actual position of the target object and the information on the position of the target object on the map match with each other, it is determined that there is a deviation between the detected position of the target object and the information on the position of the target object on the map if the distance between any, two of the host vehicle positions is equal to or greater than the deviation threshold value. Therefore, it is possible to appropriately determine the deviation between the actual position of the target object and the information on the position of the target object on the map.

As above, the preferred embodiments of the present disclosure have been described above, however, the present disclosure is not limited to the above-described embodiments. The present disclosure can be implemented in various forms including various modifications and improvements based on the knowledge of those skilled in the art, including the above-described embodiments.

The deviation determination unit 15 may determine whether or not there is a deviation between the actual position of the target object and the information on the position of the target object on the map using the difference of correction amount of the host vehicle positions instead of using the distance between the host vehicle first position and the host vehicle second position. In this case, the deviation determination unit 15 calculates a first correction amount that is an amount of correction from the reference host vehicle position estimated at the previous time to the host vehicle first position, and a second correction amount that is an amount of correction from the reference host vehicle position estimated at the previous time to the host vehicle second position. The reference host vehicle position estimated at the previous time may be the host vehicle first position or the host vehicle second position. If the difference between the first correction amount and the second correction amount is equal to or greater than the deviation threshold value, the deviation determination unit 15 determines that there is a deviation between the actual position of the target object and the information on the position of the target object on the map.

The first recognition range and the second recognition range may be imaged by one camera. In this case, the detected position recognition units 12 and 31 set the first recognition range and the second recognition range in the imaging area of one camera, and perform the processing for recognizing the target objects independent of each other.

The positions of the first recognition range, the second recognition range, the third recognition range, and the fourth recognition range may not be limited as long as the positions do not overlap each other around the host vehicle. The first recognition range, the second recognition range, the third recognition range, and the fourth recognition range do not necessarily need to be aligned in the longitudinal direction of the host vehicle MI, but may be positioned diagonally forward or backward direction of the host vehicle. In addition, the first recognition range, the second recognition range, and the third recognition range do not necessarily need to be the ranges of the same shape, and may be the ranges of different shapes. The shapes of the first recognition range, the second recognition range, the third recognition range, and the fourth recognition range are not particularly limited. Those ranges may have rectangular shapes or polygonal shapes. The host vehicle position estimation device 200 may use at least two recognition ranges out of the first recognition range, the second recognition range, the third recognition range, and the fourth recognition range, and the combinations thereof is not limited. The first recognition range or the second recognition range may be imaged by the side camera 51 or may be imaged by the rear camera 23.

The first recognition range and the second recognition range may be set within the detection range of the radar sensor 24. That is, the detected positions of the first target object and the second target object may be recognized from the result of detection performed by the radar sensor 24. The radar sensor 24 may have a detection range extending in front of the host vehicle, may have a detection range extending to the side of the host vehicle, or may have a detection range extending backward of the host vehicle. The radar sensor 24 may be configured with a plurality of millimeter wave radars or LIDAR. The radar sensor 24 may be a LIDAR having a detection range of 360 degrees. The detected position recognition units 12 and 31 may recognize detected positions of the first target object and the second target object using both the image captured by the camera such as the long-range camera 21 and the result of detection performed by the radar sensor 24. The same is applied to the third recognition range and the fourth recognition range.

The ECUs 10 and 20 do not necessarily need to include the reliability calculation unit 16. The deviation section recognition unit 17 may store the deviation start point C1 when it is determined by the deviation determination units 15 and 34 that there is the deviation, without performing the determination of the reliability.

In addition, the ECUs 10 and 20 do not necessarily need to include the deviation section recognition unit 17. When it is determined by the deviation determination units 15 and 34 that there is the deviation, the ECUs 10 and 20 may only transmit the information indicating that there is the deviation and the information on the position of the host vehicle to the server at the center, or the like.

What is claimed is:

1. A host vehicle position estimation device that estimates a host vehicle position which is a position of a host vehicle on a map based on a detected position of a target object detected by an external sensor mounted on the host vehicle and information on the position of the target object on the map, the device comprising:
    a detected position recognition unit configured to recognize a detected position of a first target object which is the target object included in a first recognition range set in advance around the host vehicle and a detected position of a second target object which is the target object included in a second recognition range around the host vehicle, based on a result of detection performed by the external sensor;
    a host vehicle first position estimation unit configured to estimate a host vehicle first position based on the detected position of the first target object and the information on the position of the first target object on the map;
    a host vehicle second position estimation unit configured to estimate a host vehicle second position based on the detected position of the second target object and the information on the position of the second target object on the map; and
    a deviation determination unit configured to determine that a deviation exists between the detected position of the target object and the information on the position of the target object on the map and to generate deviation information, if a distance between the host vehicle first position and the host vehicle second position is equal to or greater than a deviation threshold value;
    wherein the deviation information is transmitted to a server.

2. The host vehicle position estimation device according to claim 1,
    wherein the first recognition range is a range set at a position in front of the host vehicle with respect to the second recognition range.

3. The host vehicle position estimation device according to claim 1, further comprising a reliability calculation unit configured to calculate a reliability regarding the first target object, based on the map, the detected position of the first target object, and the host vehicle first position,
    wherein the deviation information based on the host vehicle first position is not transmitted to the server, when the reliability regarding the first target object is less than a reliability threshold.

4. The host vehicle position estimation device according to claim 1, further comprising a reliability calculation unit configured to calculate a reliability regarding the second target object, based on the map, the detected position of the second target object, and the host vehicle second position,
    wherein the deviation information based on the host vehicle second position is not transmitted to the server, when the reliability regarding the second target object is less than a reliability threshold.

5. The host vehicle position estimation device according to claim 1, further comprising a deviation section recognition unit configured to store a deviation starting point that is the host vehicle first position or the host vehicle second position when the deviation determination unit determines that the deviation exists, store a deviation end point that is the host vehicle first position or the host vehicle second position when the deviation determination unit determines that the deviation does not exist after storing the deviation starting point, and recognize a section between the deviation starting point and the deviation end point as a deviation section,
    wherein the information generated based on a measurement result of the deviation determination unit includes information on the deviation section.

6. The host vehicle position estimation device according to claim 1, further comprising a recognition range change unit configured to determine as to whether the first recognition range or the second recognition range is blocked by an obstacle, and change a position of the first recognition range or the second recognition range determined to be blocked by the obstacle.

7. The host vehicle position estimation device according to claim 2, further comprising an erroneous detection determination unit configured to determine whether or not an erroneous detection occurs based on a comparison of the second target object included in the current second recognition range and the first target object included in the past first recognition range, based on a vehicle speed of the host vehicle, a yaw rate of the host vehicle, and a positional relationship between the first recognition range and the second recognition range.

8. The host vehicle position estimation device according to claim 1, wherein if the deviation determination unit determines that the deviation exists between the detected position of the target object and the information on the position of the target object on the map, the position of the host vehicle on the map is updated to the host vehicle first position or the host vehicle second position.

9. The host vehicle position estimation device according to claim 1, wherein the deviation information comprises:
    a deviation start point indicating the position of the host vehicle on the map at the time when it is determined that the distance between the host vehicle first position and the host vehicle second position is equal to or greater than the deviation threshold value; and
    a deviation end point indicating the position of the host vehicle on the map at the time when it is determined that there is no deviation.

10. A host vehicle position estimation device that estimates a host vehicle position which is a position of a host vehicle on a map based on a detected position of a target object and information on the position of the target object on the map, the device comprising:
    an external sensor mounted on the host vehicle;
    at least one memory configured to store computer program code; and at least one processor configured to execute the computer program code to:
- recognize a detected position of a first target object which is the target object included in a first recognition range set in advance around the host vehicle and a detected position of a second target object which is the target object included in a second recognition range around the host vehicle, based on a result of detection performed by the external sensor;
- estimate a host vehicle first position based on the detected position of the first target object and the information on the position of the first target object on the map;
- estimate a host vehicle second position based on the detected position of the second target object and the information on the position of the second target object on the map;
- when a distance between the host vehicle first position and the host vehicle second position is equal to or greater than a deviation threshold value, determine that a deviation exists between the detected position of the target object and the information on the position of the target object on the map and generate deviation information; and
- transmit the deviation information to a server.

11. The host vehicle position estimation device according to claim 10, wherein if the deviation exists between the detected position of the target object and the information on the position of the target object on the map, the at least one processor is further configured to execute the computer program code to update the position of the host vehicle on the map to the host vehicle first position or the host vehicle second position.

* * * * *